United States Patent
Bonnett (10) Patent No.: US 6,996,730 B2
(45) Date of Patent: Feb. 7, 2006

(54) ADJUSTING VOLTAGE SUPPLIED TO A PROCESSOR IN RESPONSE TO CLOCK FREQUENCY

(75) Inventor: William B. Bonnett, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 487 days.

(21) Appl. No.: 10/303,296

(22) Filed: Nov. 25, 2002

(65) Prior Publication Data

US 2004/0103330 A1   May 27, 2004

(51) Int. Cl.
G06F 1/26 (2006.01)
G06F 1/32 (2006.01)

(52) U.S. Cl. .................. 713/322; 713/320; 713/300
(58) Field of Classification Search .......... 713/322, 713/320; 327/513
See application file for complete search history.

(56) References Cited

U.S. PATENT DOCUMENTS

| | | |
|---|---|---|
| 3,922,526 A | 11/1975 | Cochran |
| 4,700,124 A | 10/1987 | Anderson |
| 5,021,679 A | 6/1991 | Fairbanks et al. |
| 5,197,033 A | 3/1993 | Watanabe et al. |
| 5,268,871 A | 12/1993 | Dhong et al. |
| 5,307,003 A | 4/1994 | Fairbanks et al. |
| 5,440,520 A | 8/1995 | Schutz et al. |
| 5,451,892 A | 9/1995 | Bailey |
| 5,610,869 A | 3/1997 | Yoo et al. |
| 5,727,208 A | 3/1998 | Brown |
| 5,745,375 A | 4/1998 | Reinhardt et al. |
| 5,760,636 A * | 6/1998 | Noble et al. ............... 327/513 |
| 5,774,704 A | 6/1998 | Williams |
| 5,812,860 A | 9/1998 | Horden et al. |
| 5,956,289 A | 9/1999 | Norman et al. |
| 6,425,086 B1 * | 7/2002 | Clark et al. ............... 713/322 |
| 6,449,575 B2 | 9/2002 | Bausch et al. |
| 2002/0087896 A1 | 7/2002 | Dai et al. |

FOREIGN PATENT DOCUMENTS

| | | |
|---|---|---|
| WO | WO 01/35200 A | 5/2001 |
| WO | WO 02/17052 A | 2/2002 |
| WO | WO 02/29535 A | 4/2002 |

* cited by examiner

Primary Examiner—Lynne H. Browne
Assistant Examiner—Stefan Stoynov
(74) Attorney, Agent, or Firm—Robert D. Marshall, Jr.; W. James Brady, III; Frederick J. Telecky, Jr.

(57) ABSTRACT

A method and apparatus for adjusting the clock frequency and voltage supplied to an integrated circuit is provided. A request signal is sent to the clock, and in response, the clock lowers the clock frequency supplied to the integrated circuit. A frequency detection circuit monitors the clock signal and causes a voltage regulator to reduce the voltage supplied to the integrated circuit in response to the reduced clock frequency. Similarly, a request signal is sent to the clock, and in response, the clock raises the clock frequency supplied to the integrated circuit. The frequency detection circuit monitors the clock signal and causes a voltage regulator to raise the voltage supplied to the integrated circuit in response to the increased clock frequency. The slew rate of the clock is controlled so that at least a minimum required voltage for each operating frequency is provided while the clock frequency is being changed. In this manner, reliable operation of the processor is assured while the clock speed and operating voltage are being changed.

15 Claims, 4 Drawing Sheets

ADJUSTING VOLTAGE SUPPLIED TO A PROCESSOR IN RESPONSE TO CLOCK FREQUENCY

FIELD OF THE INVENTION

This invention generally relates to microprocessors, and more specifically to reducing the power consumption of a computer system by adjusting the clock frequency and voltage supplied to the processor.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

As the number of transistors incorporated into modern day integrated circuits increases, the power needed to drive these integrated circuits also increases. As this trend of packing more and more power-hungry transistors into a single integrated circuit continues, techniques to reduce the overall power consumed by these integrated circuits becomes more important.

As is well known, power consumption is related to the voltage level of the voltage supply as well as the frequency of operation by the following equation: $P=CF(V_{dd})^2$, where F is the operating frequency, C is the switched capacitance, and $V_{dd}$ is the power supply voltage. As this equation demonstrates, power may be significantly reduced by lowering the voltage level of the supply voltage. Unfortunately, the maximum performance obtainable for a given operating frequency F is also related to the supply voltage as follows: $I_{d(sat)}=\beta(V_{dd}-V_t)^\alpha$, where: $I_{d(sat)}$ is the drain current at saturation, $V_{dd}$ is the drain-to-source voltage, and $V_t$ is the threshold voltage. $\alpha$ is a process dependent parameter and is typically taken to be 2, but may be between one and two and $\beta$ has its usual meaning, well known in the art, including the width and length parameters for an metal-oxide semiconductor (MOS) transistor. Consequently, because systems are designed to operate at a voltage level that meets their peak computational performance demands, they consume significant amounts of power that is not useful at times when the peak computational capability is not required. In such systems, power is typically saved by "clock gating." In this approach, the sections of the device or system which are unused have the clocks that drive those sections turned "off." This lowers the effective frequency of operation, resulting in a linear improvement, as indicated by the equation above, essentially by lowering the average frequency by including zero frequency time spans into the average.

U.S. Pat. No. 5,760,636 entitled "Adjusting Clock Frequency and Voltage Supplied to a Processor in a Computer System" describes a method and apparatus for adjusting the clock frequency and voltage supplied to an integrated circuit in which a signal is first sent to the clock, and in response, the clock lowers the clock frequency supplied to the integrated circuit. The clock sends a signal to the voltage regulator whereupon the voltage regulator reduces the voltage supplied to the integrated circuit. The regulator sends a signal to the clock that is used to ensure the clock frequency is reduced or increased during the transition periods only when the voltage regulator supplies a high voltage to the processor.

U.S. Pat. No. 6,425,086 entitled "Method And Apparatus For Dynamic Power Control Of A Low Power Processor" describes a system in which a voltage regulator includes a control register. Processor instructions being executed by the processor may provide binary digital signals to the control register which results in the operating voltage of the processor being changed by the voltage regulator.

Still, a need exists for a technique that improves the reduction in power consumption for these low power requirement conditions, while still delivering sufficient computational performance to complete the tasks during high power requirement conditions.

SUMMARY OF THE INVENTION

An object of the invention is to provide an improved method for adjusting the clock frequency and voltage supplied to a processor.

A method and apparatus for adjusting the clock frequency and voltage supplied to an integrated circuit is provided. A request signal is sent to the clock, and in response, the clock lowers the clock frequency supplied to the integrated circuit. A frequency detection circuit monitors the clock signal and causes a voltage regulator to reduce the voltage supplied to the integrated circuit in response to the reduced clock frequency. Similarly, a request signal is sent to the clock, and in response, the clock raises the clock frequency supplied to the integrated circuit. The frequency detection circuit monitors the clock signal and causes a voltage regulator to raise the voltage supplied to the integrated circuit in response to the increased clock frequency. The rate of change (slew rate) of the clock is controlled so that at least a minimum required voltage for each operating frequency is provided while the clock frequency is being changed. In this manner, reliable operation of the processor is assured while the clock speed and operating voltage are being changed.

Other features and advantages of the present invention will be apparent from the accompanying drawings and the detailed description that follows.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which.

Corresponding numerals and symbols in the different figures and tables refer to corresponding parts unless otherwise indicated.

DETAILED DESCRIPTION OF EMBODIMENTS OF THE INVENTION

A method and apparatus is described for reducing the power consumed by a processor or other integrated circuit in a computer system by adjusting the clock frequency and voltage to the integrated circuit. In accordance with one embodiment of the present invention, a clock is coupled to and controls the frequency at which a processor operates. A frequency controlled voltage regulator is also coupled to the processor and determines the voltage at which the processor operates. In response to a particular predefined condition, the computer system signals the clock to lower its frequency, thereby lowering the frequency at which the processor operates. The frequency controlled voltage regulator monitors the system clock frequency and lowers the voltage supplied to the processor in accordance with the operating frequency. The processor continues to operate in this low power mode, reducing the drain on the battery.

In response to another condition, the system signals to the clock to raise its frequency back up to the original operating frequency so that the processor can again operate at full speed. The slew rate of the clock is limited so that a change in frequency occurs in a controlled manner. The frequency controlled voltage regulator again responds to the change in clock frequency to raise the voltage supplied to the processor in accordance with the increased operating frequency, thereby allowing the processor to again operate at full speed.

The clock frequency and voltage adjustment architecture will be described in more detail below along with timing diagrams to provide a more thorough description of the sequence of steps to follow to implement an embodiment the present invention. Various other configurations and implementations in accordance with alternate embodiments of the present invention are described in more detail below.

Figure 1:
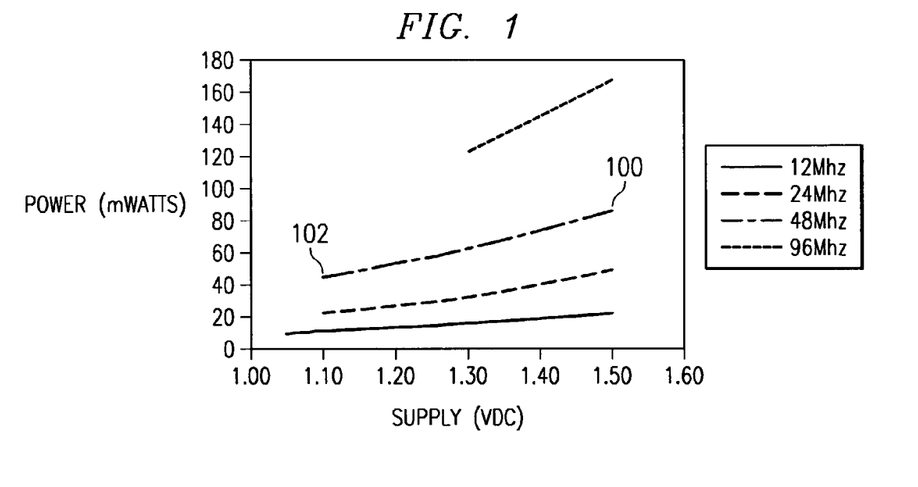
FIG. 1 is a plot of power versus supply voltage for a range of frequencies for a typical low power digital system for a wireless device having a processor, memory and various peripheral circuits.

FIG. 1 is a plot of power versus supply voltage for a range of frequencies for a typical low power digital system for a wireless device having a processor with dual multiply-accumulate (MAC) units, memory and various peripheral circuits. As can be seen by comparing the 96 mhz plot to the 48 mhz plot, for example, power consumption is reduced by reducing operating frequency. Furthermore, as expected, it can be seen that reducing operating voltage also reduces power. For example, at point 100, power dissipation at 48 mhz and 1.5 volts is approximately 85 mwatts, while at point 102 power dissipation is only about 45 mwatts at 48 mhz and 1.1 volts.

However, care must be taken in selecting operating voltage and operating frequency, since typically for a given digital circuit operation at a higher frequency requires a higher operating voltage to operate reliably. Table 1 contains data used to form the plot of FIG. 1. For certain combinations of frequency and voltage, the device is non-operational, as indicated by "xxx." Therefore, care must be taken when changing operating frequency and voltage. Techniques for determining a minimum voltage requirement for each operating frequency are known and generally involve simulation of a proposed circuit design and/or testing of a completed integrated circuit. A plot of operating frequency versus minimum operating voltage can be made based on test data or simulated data. Attempting to operate a digital system at a selected frequency when the operating voltage is less than the minimum operating voltage for that frequency generally results in erratic or erroneous operation.

TABLE 1

Voltage versus frequency operation
Power dissipation for processor/double MAC with high bus activity
ICVDD Power (m Watts)

| Voltage\frequency | 12 | 24 | 48 | 96 | 132 |
|---|---|---|---|---|---|
| 1.05 | 9.8 | xxx | xxx | xxx | xxx |
| 1.10 | 11.3 | 22.6 | 44.2 | xxx | xxx |
| 1.30 | 16 | 32.0 | 62.1 | 121.8 | xxx |
| 1.50 | 21.8 | 48.6 | 85.5 | 166.5 | 224.3 |

Figure 2:
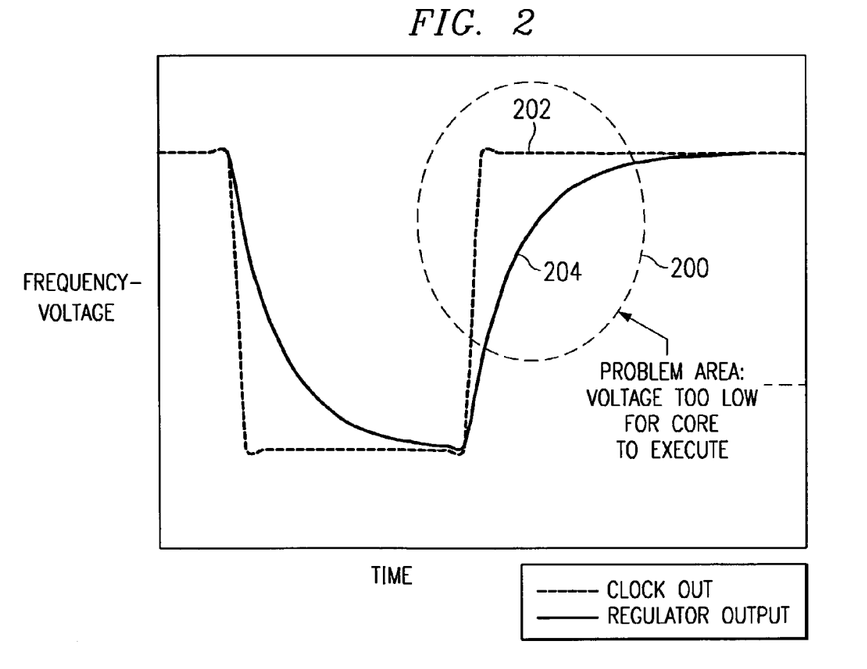
FIG. 2 is a frequency and voltage versus time plot illustrating a problem area that may occur during clock frequency speed up.

FIG. 2 is a frequency and voltage versus time plot illustrating a problem area 200 that may occur during clock frequency speed up. Plot line 202 represents system clock frequency. In response to a system event, which will be discussed in more detail later, the frequency of the clock is increased. This can happen quickly if the clock generator has a high slew rate, as indicated by plot 202. Typically, a voltage regulator has a certain delay in changing voltage level due to system capacitance and regulator response time, as indicated by plot line 204. If the clock generator and voltage regulator both start to change at the same time in response to the system event, the result may be that the system is thrust into a region of marginal or non-operation, as indicated in Table 1 and illustrated as region 200.

A "high" clock frequency value simply means that the clock is generating a frequency which causes the internal processor frequency to run at the upper nominal value for the processor. More generally, however, a "high" clock frequency is to simply be considered a frequency that is higher than the lower low clock frequency described below. Similarly, a "high" voltage is meant to identify the voltage supply level to the processor approximately equal to the upper nominal voltage supply value for the processor clocked at the high frequency. More generally, however, a "high" voltage is simply meant to indicate a voltage supply level that is higher than the lower low voltage described below.

Figure 3:
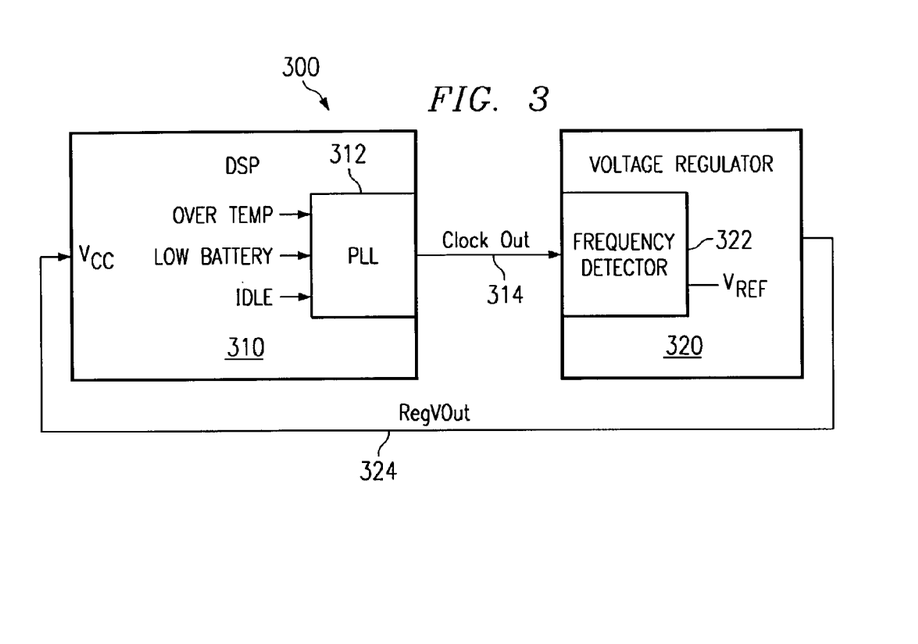
FIG. 3 is a block diagram of the system referred to in FIG. 1 illustrating a slew rate controlled phase locked loop and a frequency controlled voltage regulator, according to an aspect of the present invention.

FIG. 3 is a block diagram of the system referred to in FIG. 1 illustrating processor 310 having a slew rate controlled phase locked loop (PLL) 312 and a frequency controlled voltage regulator 320, according to an aspect of the present invention. Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Details of general construction for digital signal processors (DSPs) are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 300 relevant to an embodiment of the present invention are explained in sufficient detail herein below, so as to enable one of ordinary skill in the microprocessor art to make and use the invention.

PLL 310 generates a clock signal 314 that controls the operation of processor 310 and that is distributed to other portions of megacell 300, that may include memory and peripherals, for example, and also voltage regulator 320. PLL 310 receives various event signals that instruct it to either speed up or slow down. For example, the PLL is responsive to an over temp signal from a thermal detector that measures temperature of megacell 300, a low-bat signal that indicates when a battery that supplies power to megacell 300 is low, and an idle signal that indicates when processor 310 is not required to perform at a high rate. These event signals are illustrative for this embodiment; other embodiments may have other types of events that are used to control system clock speed. In another embodiment, circuitry separate from the PLL may receive the various event signals and form a single control signal that is provided to the PLL. Methods and means for generating a clock signal using a PLL are known and need not be described further herein.

Voltage regulator 320 receives a source voltage signal from a power source, such as a battery, and transforms and conditions the energy supplied therefrom to a voltage level that is compatible with megacell 300. This voltage level is then provided to processor 310 on regulated voltage output signal 324. This may involve reducing the voltage, or increasing the voltage, depending on the magnitude of the source. Various methods and means for voltage level transformation are known and need not be described further herein. According to an aspect of the present invention, regulator 320 includes a frequency detection circuit 322. Frequency detection circuit 322 monitors system clock signal 314 and forms a reference signal that is used by regulator 320 to determine the voltage level provided on output 324.

Figure 4:
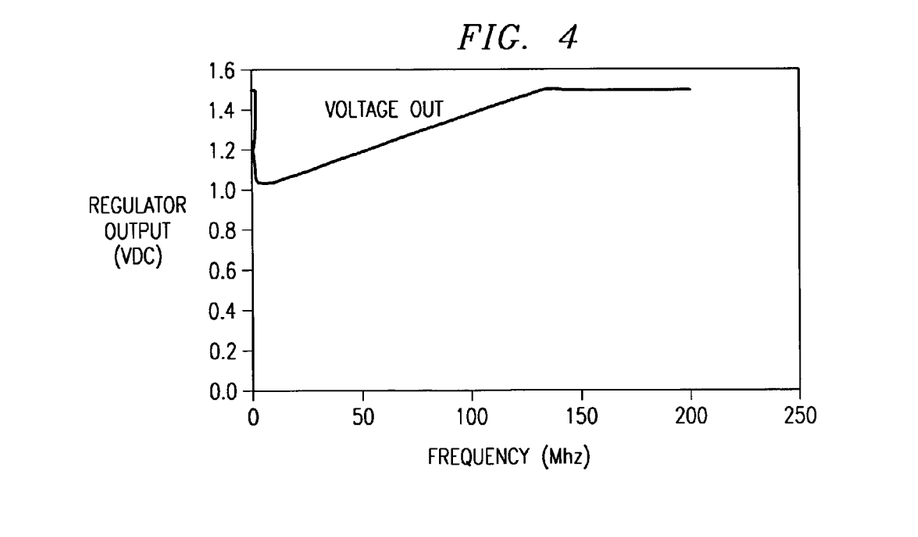
FIG. 4 is a voltage versus frequency plot of an example frequency controlled regulator for the system of FIG. 3.

FIG. 4 is a voltage versus frequency plot of an example frequency controlled regulator 320 for the system of FIG. 3. For this embodiment, regulator 320 provides a low output voltage of approximately 1.05 volts in response to a low frequency clock signal. As the clock signal frequency increases, the output voltage of regulator 320 increases to a high value of approximately 1.5 volts. For this embodiment, the shape of the transform function is linear from the low frequency range to a frequency of about 130 mhz. This transform is designed to maintain the output voltage at a value that provides reliable operation of processor 310 for any valid operation frequency, as discussed with regard to FIG. 2 and Table 1. For other embodiments that have different digital semiconductor technology, the shape of the transform may be other than linear and the various frequency and voltage levels may be different.

The design of transform circuit 322 can be readily discerned by one skilled in the art of analog design and does not need to be described in more detail here. In another embodiment, the transform circuit may be separate from the regulator and send a reference voltage signal to the regulator. In another embodiment, the transform circuit may be merged with the regulator in such a manner that a distinct reference voltage signal does not occur.

Figure 5:
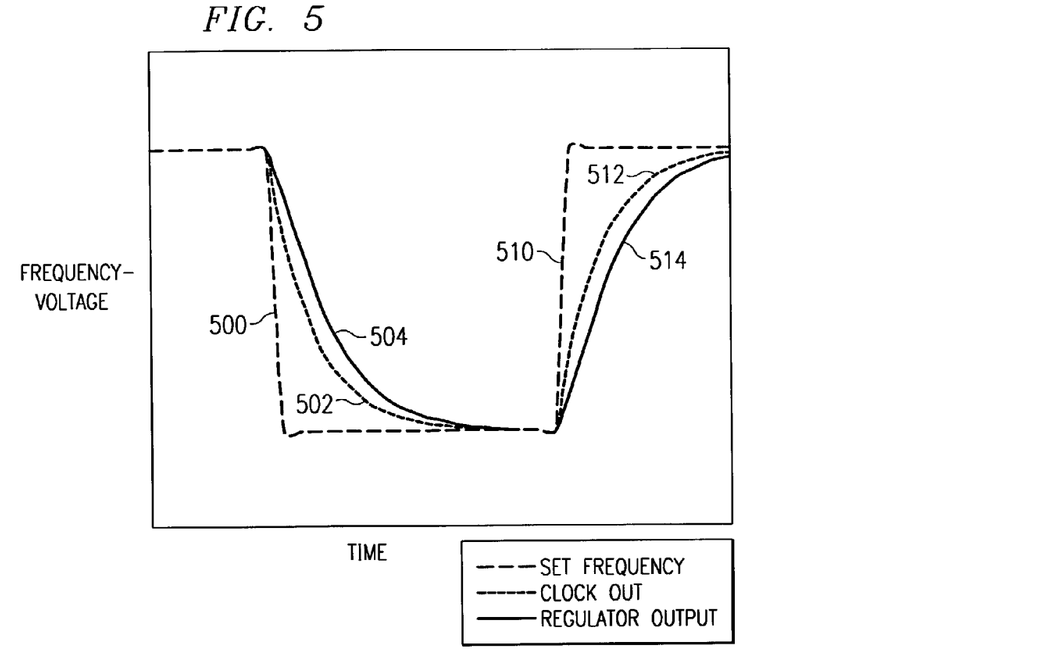
FIG. 5 is a frequency and voltage versus time plot illustrating operation of the slew rate limited phase locked loop and frequency controlled regulator in the system of FIG. 3.

FIG. 5 is a frequency and voltage versus time plot illustrating operation of the phase locked loop with limited slew rate and frequency controlled regulator in the system of FIG. 3. Signal transition 500 is representative of one or more of the event signals received by PLL 312 that requests that the clock signal slow down. In response to this request, the frequency of clock signal 314 is reduced from a high value to a low value, as indicated by plot line 502. In response to the change of frequency, voltage regulator 320 reduces the voltage level on supply line 324 from a high value to a low value as indicated by plot 504.

Similarly, signal transition 510 is representative of one or more of the event signals received by PLL 312 that requests that the clock signal speed up. In response to this request, the frequency of clock signal 314 is increased from the low value back to the high value, as indicated by plot line 512. In response to the change of frequency, voltage regulator 320 increases the voltage level on supply line 324 from the low value back to the high value as indicated by plot 514. An aspect of the present invention is that the slew rate of PLL is controlled so that the frequency increases at a slow enough rate that regulator 320 can respond to the change in frequency and increase the voltage rapidly enough so that the frequency/voltage requirements of processor 310 are not violated. Thus, the slew rate of PLL 312 is limited by an amount that is determined by the response time of detection circuit 322 and regulator 320 so that at least the minimum required voltage for each operating frequency is provided while the clock is being speeded up. In this manner, reliable operation of the processor is assured while the clock speed and operating voltage are being changed to conserve power.

Figure 6:
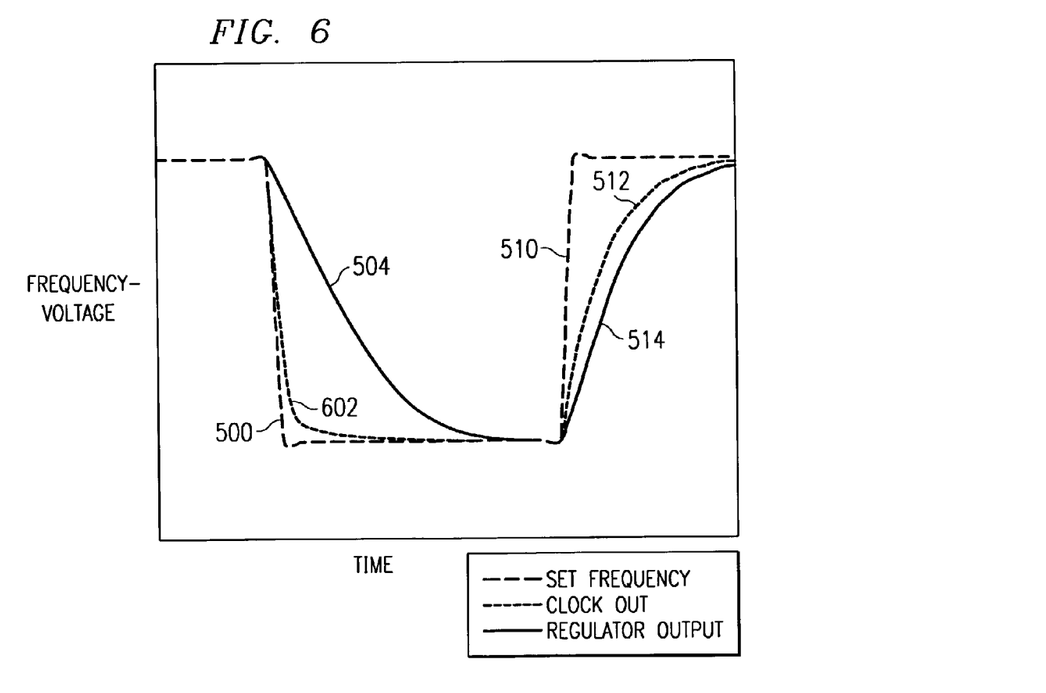
FIG. 6 is a frequency and voltage versus time plot illustrating operation of another embodiment of the slew rate limited phase locked loop and frequency controlled regulator for a system such as the one in FIG. 3.

FIG. 6 is a frequency and voltage versus time plot illustrating operation of another embodiment of a slew rate limited phase locked loop and frequency controlled regulator for a system such as the one in FIG. 3. While it is important that the clock frequency not increase at a rate that will cause it to exceed the frequency/voltage operating limit, it is generally not critical if the frequency decreases while the voltage stays high or reduces slowly. Therefore, the clock may have a higher slew rate as illustrated by plot line 602 while decreasing frequency than the slew rate while increasing frequency, illustrated by plot line 512.

Figure 7:
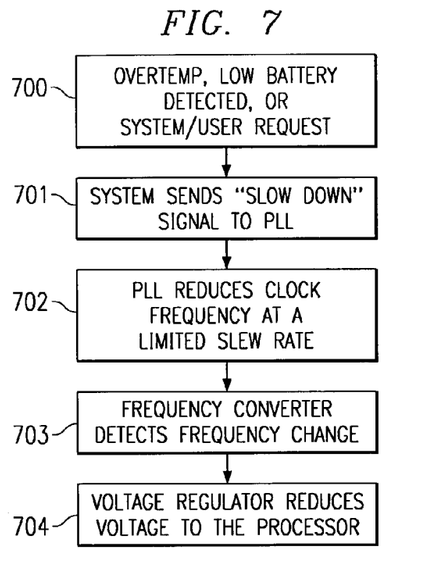
FIG. 7 is a flow chart for placing the computer system into low power mode operation in accordance with one embodiment of the present invention.

FIG. 7 is a flow chart showing a sequence of events for placing a computer system, and more particularly the processor or other integrated circuit of the computer system, into a low power mode in accordance with one embodiment of the present invention. At the first step, a subsystem of the computer system detects one of several possible events that triggers a transition to the lower power mode such as, for example, an overtemp condition, a user request, or a low battery power condition detected by the system. An overtemp condition occurs when the temperature of, for example, the processor of the computer system has exceeded a critical value above which continued operation of the system becomes unstable or unreliable. For one embodiment of the present invention, overtemp detection circuitry comprises a thermocouple disposed in proximity to the processor and coupled to a comparator. The comparator compares the thermocouple voltage or current to a reference value corresponding to the critical temperature, and transitions the logical state of its output whenever this reference value is exceeded. Much of the power consumed by the processor in a computer system is dissipated as heat. Therefore, by lowering the power consumption of the processor when it overheats, less heat is produced, thereby allowing the processor to cool off.

Another event that triggers a transition into the low power mode in accordance with an embodiment of the present invention is the detection of a user request for the lower power mode. This user request can come via the computer system software interface, such as when a user selects, for example, a low power mode icon on the display screen of the computer. Alternatively, a hardware mechanism is used whereby a switch is provided to the user that can be manually toggled to alternatively select the low power or normal operation modes. One reason a user might select a low power mode, causing the processor to operate at a slower speed, is if the user desires to sacrifice processor speed in exchange for extended battery life between charges in a battery operated computer system. Alternatively, the system automatically detects when periods of low usage or low activity occur and automatically requests entry into a low power mode.

A third event that can trigger the transition into the low power mode is the detection of a low battery power condition. Currently, in battery-operated computer systems, such as, for example, notebook computers, the system warns the user when the battery power approaches a critically low value. This warning generally affords the user a minimal amount of time to save their work and shut down the system before the system is automatically shut down. Otherwise data may be lost. In accordance with one embodiment of the present invention, upon detecting a low battery power condition, the computer system instead transitions into the lower power mode, thereby extending the use of what little power remains in the battery, affording the user additional time to finish working.

After the event that indicates the desirability of transitioning into a low power mode is detected by the system at step 700, the system sends a "slow down" signal to the clock at step 701. This signal indicates to the clock that the system desires to enter into the low power mode. As described above, the sending of a signal such as this can be implemented by, for example, asserting or deasserting a signal on a single signal line, or each event may be sent on separate signal lines. For an alternate embodiment, a binary value is sent to the clock and is interpreted by the clock to be a request for transition into the low power mode.

After the clock receives this signal at step 701, the clock reduces the frequency supplied to the processor at step 702. In accordance with one embodiment of the present invention, this lowering of the frequency supplied to the processor is implemented as a smooth transition from a high frequency to a low frequency as described above.

While the frequency is being reduced, the frequency detector circuit detects the frequency change in step 703. This indicates to the voltage regulator that the clock is reducing its frequency and causes the voltage regulator to reduce the voltage supplied to the processor. At step 704, the voltage regulator reduces the voltage supplied to the processor and the processor is now considered to have entered its low power mode of operation. During this process, steps 702, 703 and 704 are all done in a parallel manner.

Figure 8:
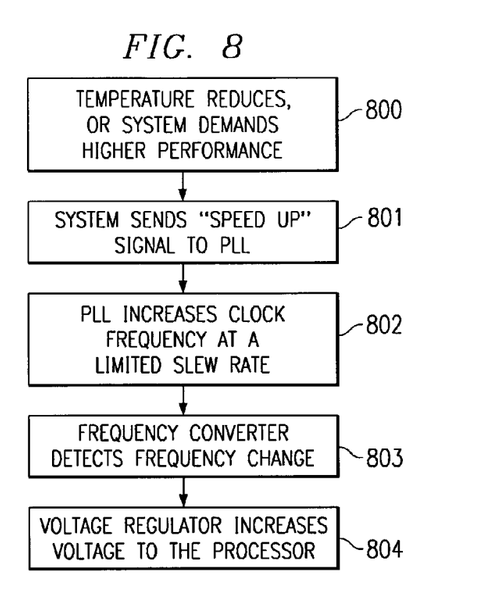
FIG. 8 is a flow chart for bringing the computer system out of low power mode in accordance with one embodiment of the present invention.

FIG. 8 is a flow chart of the steps to be taken to bring a computer system, and more particularly, the processor within the computer system, out of the low power mode and back into the normal operation mode. At the first step, step 800, some event is detected by a subsystem, which indicates the desirability of bringing the processor out of low power mode and back up to full speed. For example, as explained above, in accordance with one embodiment of the present invention, the system is placed into the low power mode due to a low battery power condition being detected by the system. For one embodiment, a user may desire to override this automatic placement into the low power mode so that the user can, for example, finish working in an application which requires the processor to operate at the high frequency. In such a case, the user may demand system speed up, requiring that the clock increase its frequency and the system transition back into the normal operation mode. For another embodiment of the present invention in which the system has entered the low power mode as a result of an overtemp condition being detected, the system transitions back into the normal operation mode once the processor has cooled off and the overtemp condition ends.

Once the system detects an event indicating the desirability to transition back into the normal operation mode at step 800, the system sends a "speed back up" signal to the clock at step 801. As described, this can be a single signal or several different signals and can be an alternate state of the slow down signal(s). The clock receives this signal and at step 802 increases the clock frequency supplied to the processor in a smooth transition, allowing the system to continue operation throughout the transitional period.

While the frequency is being increased, the frequency detector circuit detects the frequency change in step 803. This indicates to the voltage regulator that the clock is increasing its frequency and causes the voltage regulator to raise the voltage supplied to the processor. At step 804, the voltage regulator raises the voltage supplied to the processor and the processor is now considered to have entered its high power mode of operation. As discussed above, steps 802–804 are all performed in a parallel manner. More importantly, the PLL increases the clock frequency at a limited slew rate in step 802 so that at least the minimum required voltage for each operating frequency is provided while the clock is being speeded up. In this manner, reliable operation of the processor is assured while the clock speed and operating voltage are being changed to conserve power.

Figure 9:
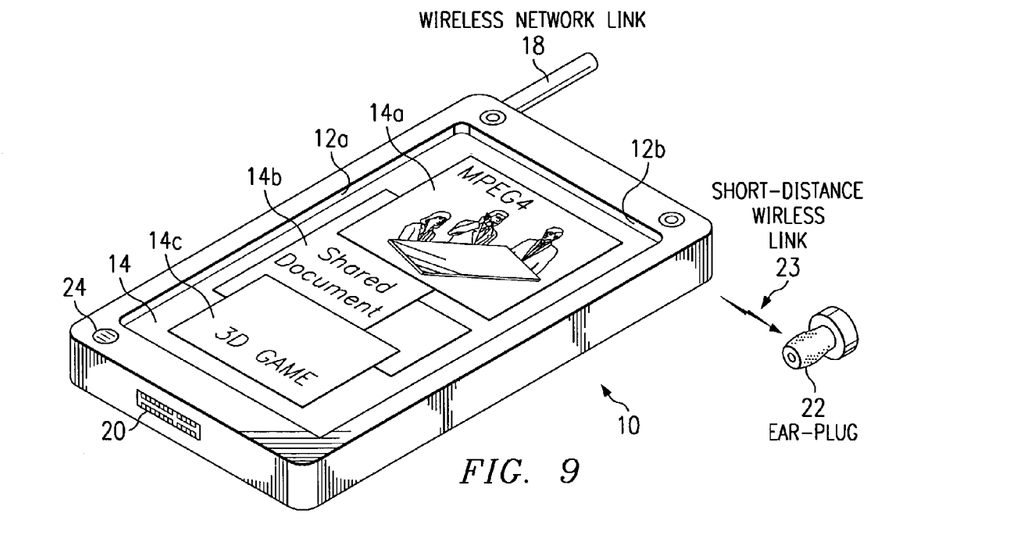
FIG. 9 illustrates an embodiment of the invention in a mobile telecommunications device, such as a mobile personal digital assistant.

FIG. 9 illustrates an embodiment of the invention in a mobile telecommunications device, such as a mobile personal digital assistant (PDA) 10 with display 14 and integrated input sensors 12*a*, 12*b* located in the periphery of display 14. Digital system 10 includes a processor, a limited slew rate PLL, and a frequency controlled regulator in accordance with the system of FIG. 3. The processor is connected to the input sensors 12*a,b* via an adapter (not shown). A stylus or finger can be used to input information to the PDA via input sensors 12*a,b*. Display 14 is connected to the processor via local frame buffer. Display 14 provides graphical and video output in overlapping windows, such as MPEG video window 14*a*, shared text document window 14*b* and three dimensional game window 14*c*, for example.

Radio frequency (RF) circuitry (not shown) is connected to an aerial 18 and is driven by megacell 100 as a processor private peripheral 140 and provides a wireless network link. Connector 20 is connected to a cable adaptor-modem (not shown) and thence to the processor as a private peripheral and provides a wired network link for use during stationary usage in an office environment, for example. A short distance wireless link 23 is also "connected" to earpiece 22 and is driven by a low power transmitter (not shown) connected to the processor as a private peripheral. Microphone 24 is similarly connected to the processor such that two-way audio information can be exchanged with other users on the wireless or wired network using microphone 24 and wireless earpiece 22.

The processor provides all encoding and decoding for audio and video/graphical information being sent and received via the wireless network link and/or the wire-based network link. The frequency controlled voltage regulator reduces supply voltage to the processor in response to a reduced clock frequency in order to reduce power consumption. Advantageously, the PLL of system 10 changes the system clock frequency in a controlled manner as described with respect to the system of FIG. 3 in response to periods of low use and low battery power, for example, so that at least the minimum required voltage for each operating frequency is provided while the clock is being speeded up. In this manner, reliable operation of the processor is assured while the clock speed and operating voltage are being changed.

It is contemplated, of course, that many other types of communications systems and computer systems may also benefit from the present invention. Examples of such other computer systems include portable computers, smart phones, web phones, and the like. As power reduction is also of concern in desktop and line-powered computer systems and micro-controller applications, it is also contemplated that the present invention may also provide benefits to such line-powered systems.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, the processor may be a DSP or general-purpose processor, or a micro-controller. The system may contain one processor or several processors.

The frequency controlled voltage regulator may respond to frequency change in a linear manner in one embodiment, but in a non-linear manner in another embodiment. Ideally, the response of the frequency-controlled regulator matches an operating-frequency versus minimum operating-voltage curve for the digital system.

In one embodiment there may be only two operating points: low frequency and high frequency. In another embodiment, there may be several operating points or there may be a range of operating points between two limits, for example.

It is therefore contemplated that the appended claims will cover any such modifications of the embodiments as fall within the true scope and spirit of the invention.

What is claimed is:

1. A method of adjusting power consumption of a computer processor, the method comprising the steps of:
    sending a first signal from a computer subsystem comprising the computer processor to a clock circuit in response to a first predetermined condition, the clock circuit providing a clock signal having a frequency to the computer processor;
    decreasing the frequency of the clock signal from a high frequency to a lower frequency in response to the first signal from the computer subsystem;
    detecting a decrease in the frequency of the clock signal and communicating said decrease to a voltage regulator in response to the step of decreasing the clock frequency, the voltage regulator having an output voltage that is provided to the computer processor;
    decreasing the output voltage of the voltage regulator from a high voltage to a lower voltage in response to the step of detecting;
    sending a second signal from the computer subsystem to the clock circuit in response to a second predetermined condition;
    increasing the frequency of the clock signal from a low frequency to a higher frequency in response to the second signal;
    detecting an increase in the frequency of the clock signal and communicating said increase to the voltage regulator in response to the step of increasing the clock frequency; and
    increasing the output voltage of the voltage regulator from the low voltage to a higher voltage in response to the step of detecting an increase in the frequency of the clock signal; and
    wherein the step of increasing the frequency of the clock signal comprises limiting a slew rate of the clock circuit so that at least a minimum required voltage for each operating frequency is provided while the frequency of the clock signal is being increased.

2. The method of claim 1, wherein the processor, the computer subsystem, the clock, and the voltage regulator are part of a battery-operated computer system, and the first predetermined condition is a low battery power condition detected by the computer subsystem.

3. The method of claim 1, wherein the first predetermined condition is a request for low power mode operation detected by the computer subsystem.

4. The method of claim 1, wherein the first predetermined condition is an overtemp condition detected by the computer subsystem.

5. The method of claim 1, wherein the second predetermined condition is a request for normal operation mode detected by the computer subsystem.

6. The method of claim 1, wherein the second predetermined condition is detected by the computer subsystem after an overtemp condition ends.

7. A method of adjusting power consumption of a computer processor, the method comprising the steps of:
    sending a first signal from a computer subsystem comprising the computer processor to a clock circuit in response to a first predetermined condition, the clock circuit providing a clock signal having a frequency to the computer processor;
    increasing the frequency of the clock signal from a low frequency to a higher frequency in response to the first signal from the computer subsystem;
    detecting an increase in the frequency of the clock signal and communicating said increase to a voltage regulator in response to the step of increasing the clock frequency, the voltage regulator having an output voltage that is provided to the computer processor; and
    increasing the output voltage of the voltage regulator from a low voltage to a higher voltage in response to the step of detecting; and
    wherein the step of increasing the frequency of the clock signal comprises limiting a slew rate of the clock circuit so that at least a minimum required voltage for each operating frequency is provided while the frequency of the clock signal is being increased.

8. The method of claim 7, further comprising the step of determining the minimum required voltage for each operating frequency.

9. A computer system comprising:
a computer subsystem including a processor;
a clock circuit having a clock input coupled to the computer subsystem, a clock signal output coupled to the processor for supplying a clock frequency to the processor, the clock circuit operable to transition to a different clock frequency in response to a request signal from the computer subsystem;
a frequency detector connected to the clock signal having an output for indicating a change in frequency of the clock signal;
a voltage regulator coupled to the frequency detector and having a regulator output coupled to and supplying a voltage to the processor, the regulator operable to transition the output to a different voltage when the frequency detector output indicates a change in clock signal frequency is occurring; and
wherein the clock circuit has a limited slew rate, such that at least a minimum required voltage for each operating frequency is provided while the frequency of the clock signal is being changed.

10. The computer system of claim 9, wherein the clock circuit has a first slew rate while the frequency is being increased and a different slew rate while the frequency is being decreased.

11. The computer system of claim 9, wherein the computer system is battery-operated.

12. The computer system of claim 11, wherein the request signal is sent from a battery charge monitor in the computer subsystem to the clock input.

13. The computer system of claim 9, wherein the request signal is sent from a performance monitor in the computer subsystem to the clock input.

14. The computer System of claim 9, wherein the request signal is sent to the clock input from a temperature detector in the computer subsystem.

15. The computer system according to claim 9 being a wireless device, further comprising:
an integrated keyboard connected to the processor via a keyboard adapter;
a display, connected to the processor via a display adapter;
radio frequency (RF) circuitry connected to the processor; and
an aerial connected to the RF circuitry.

* * * * *